United States Patent Office 2,820,069
Patented Jan. 14, 1958

2,820,069
PROCESS FOR PREPARING CHLORO-2,3,4-TRIMETHYLPENTANES

Robert A. Sanford, Park Forest, Ill., assignor to Sinclair Refining Company, New York, N. Y., a corporation of Maine No Drawing. Application June 22, 1953
Serial No. 363,388

4 Claims. (Cl. 260—663)

My invention relates to a method for the preparation of alkyl monohalides by reacting a hydrogen halide and a mono-olefin hydrocarbon having a carbon skelton or chain structure different from that of the alkyl monohalide produced, and includes the dehydrohalogenation of such monohalides to mono-olefin hydrocarbons.

Mono-olefin hydrocarbons can be reacted with hydrogen halides, such as hydrogen chloride, to provide alkyl monohalides having a carbon skelton identical with that present in the mono-olefin used as a starting material. For example, the conversion of diisobutylene (essentially a mixture of 2,4,4-trimethyl-2-pentene and 2,4,4-trimethyl-1-pentene) to 2,4,4-trimethyl-2-chloropentane can be readily accomplished by the addition of anhydrous hydrogen chloride to the diisobutylene at 0–25° C. and under a pressure of 100 p. s. i. g. The reaction can be conducted in a stainless steel pressure vessel stirred by means of plunger-type agitation. The hydrogen chloride is bled into the reactor over a period of thirty minutes while maintaining the reaction temperature below 25° C. Conversions which are almost quantitative are observed, infrared analysis and determination of physical properties of the product showing it to be 2,4,4-trimethyl-2-chloropentane.

In accordance with my invention, I have discovered that certain mono-olefin hydrocarbons can be reacted with hydrogen halides to provide alkyl monohalides having a carbon skeleton which is different from that present in the mono-olefin starting material. In order to accomplish this result, I hydrohalogenate the mono-olefin hydrocarbon while the reaction mixture contains a suitable amount of a Friedel-Crafts catalyst.

My invention is particularly valuable in that it provides a method whereby rearrangement of mono-olefin hydrocarbons can be effected to produce compounds having a carbon structure different from the mono-olefin hydrocarbons. Thus, my invention provides a method whereby mono-olefin hydrocarbons which contain a neopentyl structure can be rearranged. For example, mono-olefin hydrocarbons which contain the carbon skeleton

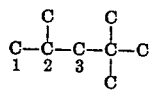

wherein the olefin group located at the 1,2- or 2,3-position can be converted into a mono-alkyl halide which contains the same number of carbon atoms as the mono-olefin hydrocarbon used as a starting material and which also contains the carbon skeleton

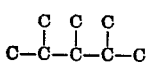

wherein the halogen atoms is attached at the 2- or 3-position. Such alkyl halides have heretofore been difficult to prepare.

The alkyl halides produced when the process of my invention is carried out find wide use as chemical intermediates. Thus, they can be dehydrohalogenated in accordance with known procedures to provide mono-olefins having the same number of carbon atoms and the same carbon skeleton as the alkyl halide dehydrohalogenated. For example, the alkyl halides can be dehydrohalogenated by passing them in vapor phase through a tube-type reactor containing $Al_2O_3$, $BaCl_2$, MgO, etc. at temperatures generally of the order of 150° C. to 400° C., depending upon the space velocity used and other process variables. The dehydrohalogenation can also be carried out by heating the alkyl halides in liquid phase in contact with certain heavy metal salts which are not decomposed by hydrogen halides such as nickelous chloride, zinc chloride, cobaltous chloride, ferrous chloride and stannous chloride, olefins and hydrogen halides being taken off overhead, for example as is described in greater detail in my copending application Serial No. 323,721, filed December 2, 1952, now abandoned. If desired, the alkyl halides can also be dehydrohalogenated using an alcoholic solution of a strong alkali, such as NaOH or KOH. The mono-olefins thus produced can be used in the preparation of polymers. On the other hand, the alkyl halides produced can be used as alkylating agents or intermediates for the preparation of alcohols, nitriles, acids, ethers, mercaptans, sulfides, amines, esters and dienes (both conjugated and non-conjugated).

As a typical example falling within the scope of my invention, 10 gram moles of diisobutylene and 25 grams of stannic chloride were stirred in a stainless steel autoclave for 60 hours at a temperature of 0–25° C. in contact with anhydrous hydrogen chloride maintained at a pressure of 100 p. s. i. g. Distillation of the product showed 100 percent conversion of the diisobutylene to alkyl chlorides. About 16 percent of these alkyl chlorides boiled either higher or lower than octyl chlorides. The remaining 84 percent consisted of about equal amounts of 2,4,4-trimethyl-2-chloropentane and 2- and 3-chloro-2,3,4-trimethylpentane. The mixture of 2- and 3-chloro-2,3,4-trimethylpentanes (boiling point 160–2° C.) was easily separated by distillation. Analysis of the mixture of 2- and 3-chloro-2,3,4-trimethylpentanes separated by distillation showed 23.6 percent chlorine (calculated, 23.9 percent). The mixture had a $n_D^{25}$ of 1.4362–1.4391 and infrared analysis showed the presence of the tertiary chloride of 2,3,4-trimethylpentane. Dehydrochlorination of the 2-chloro- and 3-chloro-2,3,4-trimethylpentane in accordance with usual procedures gives good yields of 2,3,4-trimethylpentenes.

Various modifications can be made in the specific procedure just described to provide other embodiments which fall within the broad scope of my invention. For example, in place of the diisobutylene used there can be substituted mono-olefin hydrocarbons having up to sixteen carbon atoms prepared by the polymerization of propylene, the butylenes or mixtures thereof. Thus, in place of diisobutylene there can be used triisobutylene, propylene trimers, copolymers of propylene and butenes and the like. Other monohaloalkanes can be prepared similarly by using hydrogen halides other than hydrogen chloride, for example hydrogen bromide.

In accordance with my invention the mono-olefin hydrocarbon and hydrogen halide are reacted while the reaction mixture contains a Friedel-Crafts catalyst. A wide variety of such catalysts is known, and in place of the stannic chloride used in the specific illustration there can be substituted other inorganic metal halide catalysts, such as zirconium chloride, zinc chloride, zinc fluoride, aluminum chloride, aluminum bromide, aluminum iodide, titanium chloride, antimony chloride and ferric chloride. The reaction conditions of temperature, pressure and desired result, but in general the reaction time is prolonged, as the specific example illustrates.

I claim:

1. A method of preparing a chloro-2,3,4-trimethylpentane which comprises reacting a member selected from the group consisting of 2,4,4-trimethyl-1-pentene and 2,4,4-trimethyl-2-pentene with hydrogen chloride in the presence of a catalytic amount of a Friedel-Crafts catalyst and at a temperature of 0 to 25° C. and a prolonged reaction time.

2. A method of preparing chloro-2,3,4-trimethylpentanes which comprises reacting diisobutylene with hydrogen chloride in the presence of a catalyst amount of a Friedel-Crafts catalyst and at a temperature of 0 to 25° C. and a prolonged reaction time.

3. The method of claim 1 in which the catalyst is stannic chloride.

4. The method of claim 2 in which the catalyst is stannic chloride.

References Cited in the file of this patent

UNITED STATES PATENTS

| 2,485,265 | Eby | Oct. 18, 1949 |
| 2,512,649 | Howard et al. | June 27, 1950 |

FOREIGN PATENTS

| 498,349 | Great Britain | Jan. 6, 1939 |
| 535,145 | Great Britain | Mar. 31, 1941 |